United States Patent
Uesugi (10) Patent No.: US 11,436,707 B2
(45) Date of Patent: Sep. 6, 2022

(54) IMAGE STABILIZATION CONTROL APPARATUS, METHOD OF CONTROLLING IMAGE STABILIZER, IMAGE CAPTURING APPARATUS, AND STORAGE MEDIUM

(71) Applicant: CANON KABUSHIKI KAISHA, Tokyo (JP)

(72) Inventor: Tomomi Uesugi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 343 days.

(21) Appl. No.: 16/807,618

(22) Filed: Mar. 3, 2020

(65) Prior Publication Data
US 2020/0294205 A1 Sep. 17, 2020

(30) Foreign Application Priority Data
Mar. 13, 2019 (JP) .............................. JP2019-046376

(51) Int. Cl.
| | |
|---|---|
| H04N 5/232 | (2006.01) |
| G06T 5/00 | (2006.01) |
| G06T 7/20 | (2017.01) |
| G06T 7/80 | (2017.01) |

(52) U.S. Cl.
CPC ................ *G06T 5/003* (2013.01); *G06T 7/20* (2013.01); *G06T 7/80* (2017.01); *H04N 5/23216* (2013.01); *H04N 5/23258* (2013.01); *G06T 2207/20201* (2013.01)

(58) Field of Classification Search
CPC ........................ H04N 5/23216; H04N 5/23258
See application file for complete search history.

(56) References Cited

U.S. PATENT DOCUMENTS

| | | | | |
|---|---|---|---|---|
| 8,144,203 B2* | 3/2012 | Washisu | ............. | H04N 5/23287 348/208.99 |
| 8,159,545 B2* | 4/2012 | Washisu | ................... | G03B 5/00 359/557 |
| 8,233,786 B2* | 7/2012 | Masuda | ................. | G03B 17/00 348/208.4 |
| 8,471,916 B2* | 6/2013 | Washisu | ............. | H04N 5/23264 348/208.99 |
| 8,497,915 B2* | 7/2013 | Tsukamoto | ............ | G03D 17/00 348/208.4 |

(Continued)

FOREIGN PATENT DOCUMENTS

| | | |
|---|---|---|
| JP | 2012-088466 A | 5/2012 |
| JP | 2014-016515 A | 1/2014 |

*Primary Examiner* — Brian P Yenke
(74) *Attorney, Agent, or Firm* — Venable LLP (57) ABSTRACT

An image stabilization control apparatus includes an extraction unit configured to extract signals in a plurality of frequency bands from a signal output from a first shake detection sensor detecting a translation component of shake, and extract signals in the plurality of frequency bands from a signal output from a second shake detection sensor detect detecting a rotation component of shake; a first calculation unit configured to calculate a rotational radius of shake for each of the plurality of frequency bands, using the signal from the first shake detection sensor and the signal from the second shake detection sensor; and a second calculation unit configured to calculate a parallel shake amount for each of the plurality of frequency bands, using the signal output from the second shake detection sensor and the rotational radius.

19 Claims, 7 Drawing Sheets

(56) References Cited

U.S. PATENT DOCUMENTS

| | | | |
|---|---|---|---|
| 8,509,610 B2 | 8/2013 | Wakamatsu | |
| 8,792,011 B2 * | 7/2014 | Washisu | H04N 5/23248 396/53 |
| 8,803,983 B2 * | 8/2014 | Miyazawa | H04N 5/23287 348/208.11 |
| 8,957,974 B2 * | 2/2015 | Washisu | G02B 27/646 396/53 |
| 9,088,718 B2 * | 7/2015 | Tsubaki | H04N 5/23267 |
| 9,219,863 B2 * | 12/2015 | Watanabe | H04N 5/23258 |
| 9,225,900 B2 * | 12/2015 | Miyasako | H04N 5/23258 |
| 9,813,627 B2 * | 11/2017 | Wakamatsu | H04N 5/23287 |
| 9,906,726 B2 * | 2/2018 | Kajimura | H04N 5/23258 |
| 10,091,423 B2 * | 10/2018 | Wakamatsu | H04N 5/23287 |
| 10,222,679 B2 * | 3/2019 | Wakamatsu | H04N 5/23258 |
| 10,686,989 B2 * | 6/2020 | Takeuchi | G02B 27/646 |
| 10,827,124 B2 * | 11/2020 | Imanishi | H04N 5/23287 |
| 10,992,867 B2 | 4/2021 | Uesugi et al. | |
| 11,003,054 B2 * | 5/2021 | Kabasawa | G03B 7/091 |
| 11,233,942 B2 * | 1/2022 | Uesugi | H04N 5/23261 |
| 11,290,650 B2 * | 3/2022 | Yasuda | H04N 5/23254 |
| 2012/0093493 A1 | 4/2012 | Wakamatsu | |

* cited by examiner

FIG. 1A

100: Digital Camera
1: Camera
2: Lens
3: Imaging Optical System
4: Optical Axis
6: Imaging Device
12: Lens System Control Unit
14: Shake Correction Unit
15: Angular Velocity Detection Unit
16: Acceleration Detection Unit
17: Shutter Mechanism

IMAGE STABILIZATION CONTROL APPARATUS, METHOD OF CONTROLLING IMAGE STABILIZER, IMAGE CAPTURING APPARATUS, AND STORAGE MEDIUM

BACKGROUND OF THE INVENTION

Field of the Invention

The present invention relates to a technique for correcting image blur that occurs in an image capturing apparatus due to camera shake or the like, thereby suppressing image degradation.

Description of the Related Art

The modern cameras are fully automated regarding important image capturing tasks such as exposure determination and focusing, with which even users who are not familiar with the operations thereof are very unlikely to fail to capture images. Also, with cameras that are provided with an image stabilizer that includes a shake detection unit, a shake correction unit, and so on for preventing image blur from occurring due to camera shake or the like, there are almost no factors that may cause a failure when users capture images.

Here, an image stabilizer will be briefly described. In order to make it possible to capture an image without image blur even if camera shake occurs during exposure, it is required that angle shake of the camera caused by camera shake is detected, and a stabilization lens is moved according to the detected value.

In addition, image degradation caused by shake that cannot be detected using an angular velocity meter alone, i.e. so-called parallel shake applied in a horizontal direction or a vertical direction within a plane that is orthogonal to the optical axis of the camera, is not negligible. Japanese Patent Laid-Open No. 2012-88466 discloses a technique for obtaining parallel shake by performing second-order integration on acceleration detected by an accelerometer, and driving a shake correction unit, using the parallel shake together with an output from an angular velocity meter provided separately.

In the method disclosed in Japanese Patent Laid-Open No. 2012-88466, it is assumed that the human body rotates about one rotation center with one rotation radius. Using this assumption, parallel shake that is applied to an image capturing apparatus is calculated based on a signal from an angular velocity sensor. However, the human body may also rotate about two or more rotation centers, and therefore there is a problem in which parallel shake that cannot be calculated based on this assumption remains.

SUMMARY OF THE INVENTION

The present invention has been made in view of the above-described problem, and aims to provide an image stabilization control apparatus that can correct parallel shake caused due to the presence of a plurality of rotation centers.

According to a first aspect of the present invention, there is provided an image stabilization control apparatus comprising at least one processor or circuit configured to function as: an extraction unit configured to extract signals in a plurality of frequency bands from a signal output from a first shake detection sensor that detects a translation component of shake in a direction of a first axis, and extract signals in the plurality of frequency bands from a signal output from a second shake detection sensor that detects a rotation component of shake about a second axis that is orthogonal to the first axis; a first calculation unit configured to calculate a rotational radius of shake for each of the plurality of frequency bands, using the signal output from the first shake detection sensor, extracted by the extraction unit, and the signal output from the second shake detection sensor, extracted by the extraction unit; and a second calculation unit configured to calculate a parallel shake amount in the direction of the first axis for each of the plurality of frequency bands, using the signal output from the second shake detection sensor, extracted by the extraction unit, and the rotational radius of shake, calculated for the same frequency band as that of the output signal from the second shake detection sensor.

According to a second aspect of the present invention, there is provided an image capturing apparatus comprising: an imaging device configured to generate an image signal; a first shake detection sensor configured to detect a translation component of shake in a direction of a first axis; a second shake detection sensor configured to detect a rotation component of shake about a second axis that is orthogonal to the first axis; and at least one processor or circuit configured to function as: an extraction unit configured to extract signals in a plurality of frequency bands from a signal output from the first shake detection sensor, and extract signals in the plurality of frequency bands from a signal output from the second shake detection sensor; a first calculation unit configured to calculate a rotational radius of shake for each of the plurality of frequency bands, using the signal output from the first shake detection sensor, extracted by the extraction unit, and the signal output from the second shake detection sensor, extracted by the extraction unit; and a second calculation unit configured to calculate a parallel shake amount in the direction of the first axis for each of the plurality of frequency bands, using the signal output from the second shake detection sensor, extracted by the extraction unit, and the rotational radius of shake, calculated for the same frequency band as that of the output signal from the second shake detection sensor.

According to a third aspect of the present invention, there is provided a method of controlling an image stabilization apparatus, comprising: performing a first shake detection to detect a translation component of shake in a direction of a first axis; performing a second shake detection to detect a rotation component of shake about a second axis that is orthogonal to the first axis; extracting signals in a plurality of frequency bands from a signal output from the first shake detection, and extracting signals in the plurality of frequency bands from a signal output from the second shake detection; performing a first calculation to calculate a rotational radius of shake for each of the plurality of frequency bands, using the signal output from the first shake detection, extracted in the extraction, and the signal output from the second shake detection, extracted in the extraction; and performing a second calculation to calculate a parallel shake amount in the direction of the first axis for each of the plurality of frequency bands, using the signal output from the second shake detection, extracted in the extraction, and the rotational radius of shake, calculated for the same frequency band as that of the output signal from the second shake detection.

Further features of the present invention will become apparent from the following description of exemplary embodiments with reference to the attached drawings.

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

Figure 1A:
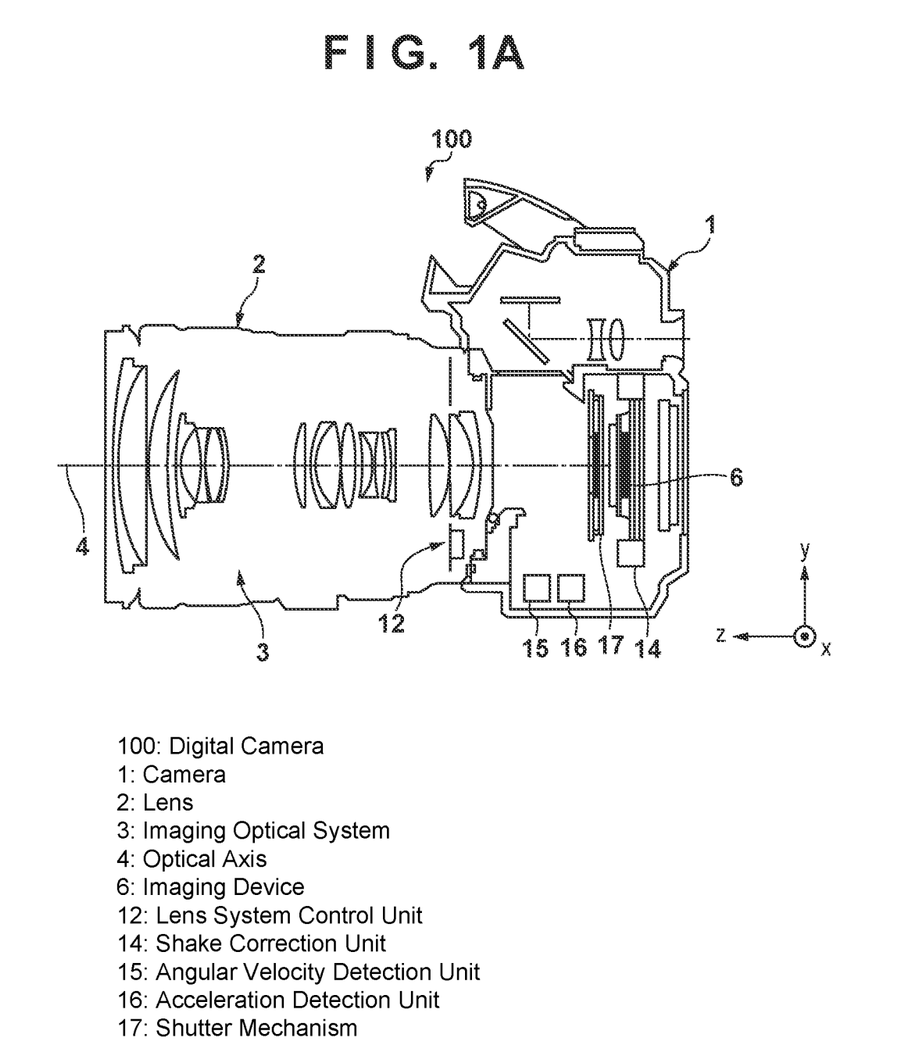
FIGS. 1A and 1B are diagrams showing a configuration of a mirrorless interchangeable-lens digital camera 100, which is an embodiment of an image capturing apparatus according to the present invention.
Figure 1B:
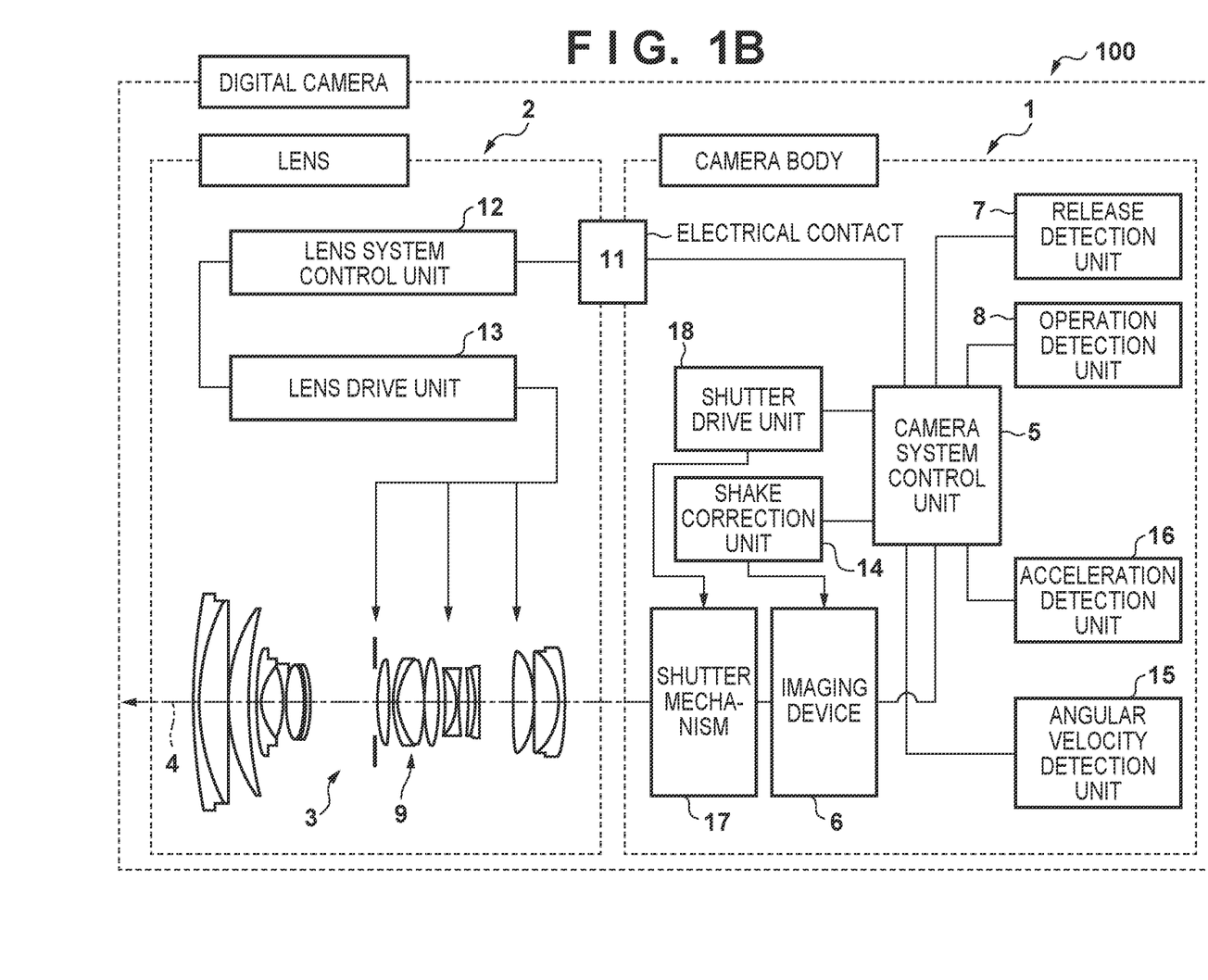

FIGS. 1A and 1B are diagrams showing a configuration of a mirrorless interchangeable-lens digital camera 100, which is an embodiment of an image capturing apparatus according to the present invention. FIG. 1A is a central cross-sectional diagram of the digital camera 100 according to an embodiment, and FIG. 1B is a block diagram showing an electrical configuration of the digital camera 100.

In FIG. 1A, the digital camera 100 includes a camera body 1 and a lens 2 that is detachably attached to the camera 1. The lens 2 is provided with an imaging optical system 3 that includes a plurality of lenses that have an optical axis 4. The lens 2 is provided with a lens drive unit 13 so that a light beam from a subject, which has passed through the lens 2, desirably forms an image on an imaging device 6 of the camera body 1. The lens drive unit 13 drives the imaging optical system 3 upon receiving a control signal from a lens system control unit 12. The imaging optical system 3 includes a focus adjustment unit, a diaphragm drive unit, an image stabilization lens 9, and so on.

Also, in the camera body 1, a shutter mechanism 17 is subjected to drive control performed by a shutter drive unit 18 so that exposure is performed for a shooting period that has been set by the user or has been determined by a camera system control unit 5. The camera system control unit 5 calculates a shake correction amount for alleviating the influence of shake, based on signals output from a release detection unit 7, an operation detection unit 8, an acceleration detection unit 16, and an angular velocity detection unit 15, and outputs the shake correction amount to a shake correction unit 14 and the lens system control unit 12. The operation detection unit 8 detects a user operation such as an operation performed to set the shutter speed, the f-number, the height of the user, and so on (shooting conditions).

The shake correction unit 14 drives the imaging device 6 so as to move within a plane that is orthogonal to the optical axis 4, based on the shake correction amount received from the camera system control unit 5. The camera body 1 includes the release detection unit 7. The release detection unit 7 detects an open/close signal from a release switch (not shown) and sends the detected open/close signal to the camera system control unit 5. The release detection unit 7 detects two types of open/close signals. Specifically, the release detection unit 7 can detect two stages of switches, namely a switch SW1, which is turned ON when a release button is half-pressed, and a switch SW2, which is turned ON when the release button is fully pressed.

In FIG. 1A, the z axis is an axis that is parallel to the optical axis 4. The x axis and the y axis are orthogonal to the z axis. The relationship between the axes is as shown in FIG. 1A, and a left-right direction of the digital camera 100 is indicated by the x axis, and a top-bottom direction of the digital camera 100 is indicated by the y axis. Also, the x axis and the y axis are orthogonal to each other. In addition, although the origin is shown outside the digital camera 100 in FIGS. 1A, 1B, and 2 in order to expedite understanding, the origin in reality is located at the center of the imaging device 6.

The lens system control unit 12 outputs an instruction that is based on a shake correction amount, to the lens drive unit 13. The lens drive unit 13 drives the image stabilization lens 9 so as to move in the x direction and the y direction in FIG. 1A, thereby performing shake correction in which both angle shake and parallel shake are taken into account. The shake correction unit 14 drives the imaging device 6 so as to move in the x direction and the y direction in FIG. 1A, thereby performing shake correction in which both angle shake and parallel shake are taken into account. The shake correction unit 14 drives the imaging device 6 so as to rotate about the z axis as well, thereby performing shake correction in which both angle shake and parallel shake occurring due to rotational movement about the z axis are taken into account. A stabilization method that is based on the shake correction amount received from the camera system control unit 5 is not limited to this method, and may be realized in another mode. For example, there is a method using so-called electronic image stabilization through which the influence of shake is alleviated by changing the cutout position of each captured frame generated by the imaging device 6. It is also possible to use an appropriate combination of such stabilization methods.

Figure 2A:
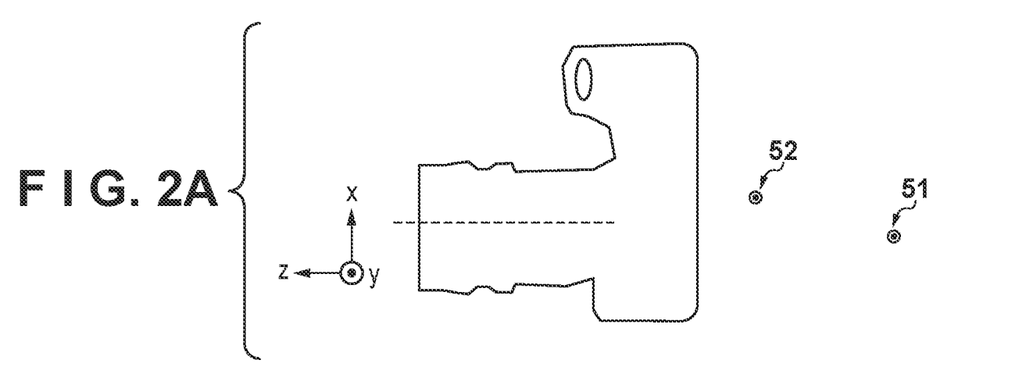
FIGS. 2A to 2C are diagrams showing the digital camera 100 viewed in respective axis directions.
Figure 2B:
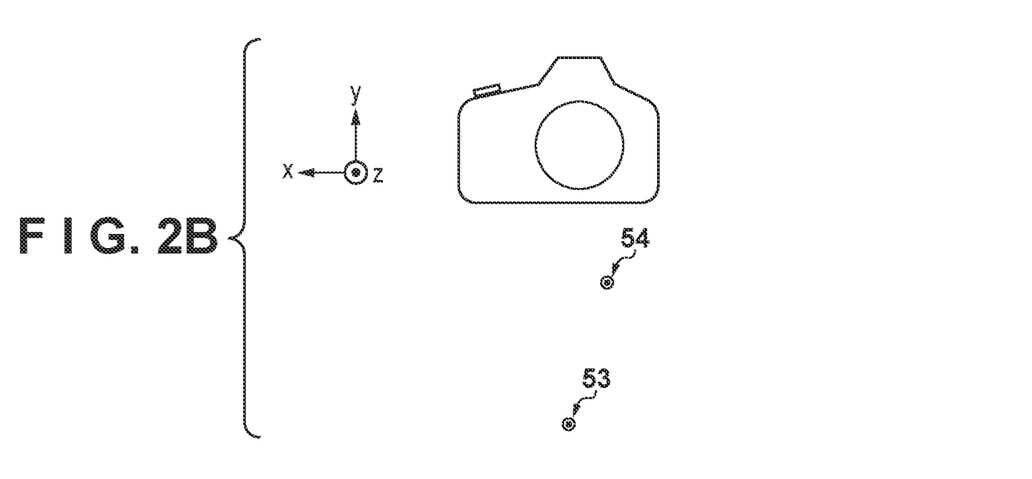
Figure 2C:
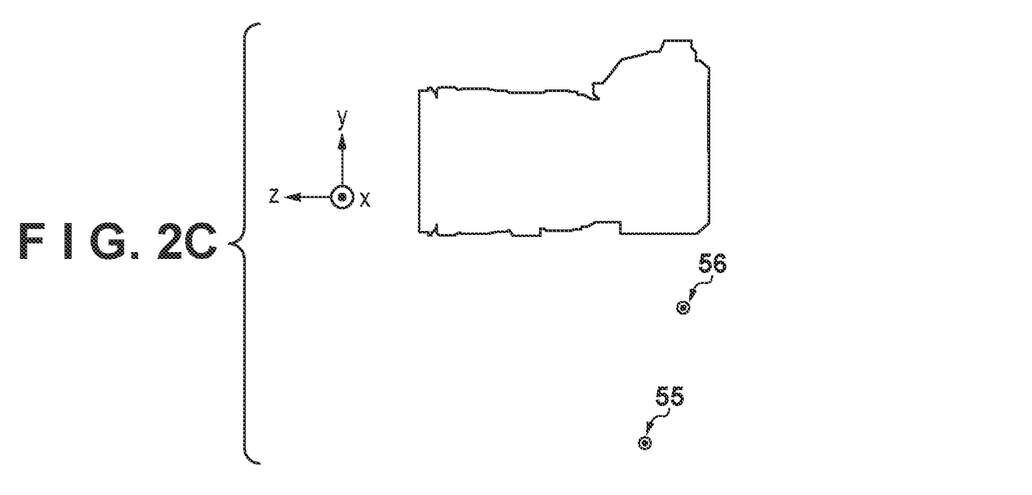

The following describes characteristics of camera shake caused by a user holding the digital camera 100 with reference to FIGS. 2A to 2C.

When holding the digital camera 100, the human body mainly moves through a combination of rotational movements about a joint or the like. The digital camera 100 is held by a human, and is therefore affected by rotational movements of the human body and rotates together with the human body. The following is a study of the movement of the digital camera 100 at this time. The movement of the digital camera 100 with reference to the center of the imaging device 6 can be regarded as a combination of a rotational movement about the imaging device 6 and a translational movement. Parallel shake of the digital camera 100 is corrected using the relationship between a rotational movement about the imaging device 6 and a translational movement of the digital camera 100.

The following is a study of parallel shake of the digital camera 100 caused due to a rotational movement about a joint or the like of a human body. As described above, there are a plurality of axes of rotation regarding rotational movement of a human body. Therefore, when parallel shake is to be calculated, a plurality of axes of rotation need be taken into account. When holding the digital camera 100, the human body mainly moves through a combination of rotational movements about a joint or the like. Although joints often serve as the axes of rotation, an external part of the human body may also serve as the axis of a rotational movement. This is because parts of a human body move like parallel links.

FIG. 2A is a diagram showing the digital camera 100 viewed in the y+ direction, where there are two axes of rotation. An axis 51 and an axis 52 are axes that are parallel to the y axis of the digital camera 100. The axis 51 and the axis 52 are examples of axes of rotational movement of the human body. For example, the axis 51 corresponds to the central axis of the human body, and the axis 52 corresponds to an arm of the human body. As described above, another joint or the like may also serve as an axis. Examples include a front part and a rear part of the human body. Shake of the digital camera 100 is caused by a rotational movement of the human body about the axis 51 and a rotational movement of the human body about the axis 52.

FIG. 2B is a diagram showing the digital camera 100 viewed in the z+ direction, where there are two axes of rotation. An axis 53 and an axis 54 are axes that are parallel to the z axis of the digital camera 100. The axis 53 and the axis 54 are examples of axes of rotational movement of the human body. For example, the axis 53 corresponds to a leg of the human body, and the axis 54 corresponds to the waist of the human body. As described above, another joint or the like may also serve as an axis. For example, an axis may be an external part lower than a leg of the human body, or an arm of the human body. Shake of the digital camera 100 is caused by a rotational movement about the axis 53 and a rotational movement about the axis 54.

FIG. 2C is a diagram showing the digital camera 100 viewed in the x+ direction, where there are two axes of rotation. An axis 55 and an axis 56 are axes that are parallel to the x axis of the digital camera 100. The axis 55 and the axis 56 are examples of axes of rotational movement of the human body. For example, the axis 55 corresponds to a leg, and the axis 56 corresponds to the waist. As described above, another joint or the like may also serve as an axis. For example, an axis may be an external part lower than a leg of the human body, or an arm. Shake of the digital camera 100 is caused by a rotational movement about the axis 55 and a rotational movement about the axis 56.

Shake of the digital camera 100 is caused by rotational movements about the axes shown in FIGS. 2A to 2C.

A rotational movement of the digital camera 100 can be regarded as a combination of a rotational movement about an axis that is parallel to the y axis, a rotational movement about an axis that is parallel to the z axis, and a rotational movement about an axis that is parallel to the x axis. The amount of shake is calculated assuming that the digital camera 100 is performing rotational movements about a plurality of axes of rotation.

Rotational movements of the digital camera 100 about the axes 51 to 56 can be broken down into rotational movements about the y axis, the z axis, and the x axis, and translational movements in the x, y, and z directions of the digital camera 100. Rotational movements of the digital camera 100 about the axis 51 and the axis 52 can be broken down into a rotational movement of the digital camera 100 about the y axis, a translational movement of the digital camera 100 in the x axis direction, and a translational movement of the digital camera 100 in the z axis direction. Rotational movements of the digital camera 100 about the axis 53 and the axis 54 can be broken down into a rotational movement of the digital camera 100 about the z axis, a translational movement of the digital camera 100 in the x axis direction, and a translational movement of the digital camera 100 in the y axis direction. Rotational movements of the digital camera 100 about the axis 55 and the axis 56 can be broken down into a rotational movement of the digital camera 100 about the x axis, a translational movement of the digital camera 100 in the y axis direction, and a translational movement of the digital camera 100 in the z axis direction.

Shake of the digital camera 100 in the x axis direction caused by the rotational movements about the axis 51 and the axis 52 is the addition of shake in the x axis direction caused by a rotational movement about the axis 51 and shake in the x axis direction caused by a rotational movement about the axis 52. Shake of the digital camera 100 in the z axis direction caused by the rotational movements about the axis 51 and the axis 52 is the addition of shake in the z axis direction caused by a rotational movement about the axis 51 and shake in the z axis direction caused by a rotational movement about the axis 52.

Shake of the digital camera 100 in the x axis direction caused by the rotational movements about the axis 53 and the axis 54 is the addition of shake in the x axis direction caused by a rotational movement about the axis 53 and shake in the x axis direction caused by a rotational movement about the axis 54. Shake of the digital camera 100 in the y axis direction caused by the rotational movements about the axis 53 and the axis 54 is the addition of shake in the y axis direction caused by a rotational movement about the axis 53 and shake in the y axis direction caused by a rotational movement about the axis 54.

Shake of the digital camera 100 in the z axis direction caused by the rotational movements about the axis 55 and the axis 56 is the addition of shake in the z axis direction caused by a rotational movement about the axis 55 and shake in the z axis direction caused by a rotational movement about the axis 56. Shake of the digital camera 100 in the y axis direction caused by the rotational movements about the axis 55 and the axis 56 is the addition of shake in the y axis direction caused by a rotational movement about the axis 55 and shake in the y axis direction caused by a rotational movement about the axis 56.

Shake of the digital camera 100 in the x axis direction is the addition of shake in the x axis direction caused by rotational movements about the axis 53 and the axis 54 and shake in the x axis direction caused by rotational movements about the axis 51 and the axis 52. Shake of the digital camera 100 in the y axis direction is the addition of shake in the y axis direction caused by rotational movements about the axis 53 and the axis 54 and shake in the y axis direction caused by rotational movements about the axis 55 and the axis 56. Shake of the digital camera 100 in the z axis direction is the addition of shake in the z axis direction caused by rotational movements about the axis 55 and the axis 56 and shake in the z axis direction caused by rotational movements about the axis 51 and the axis 52.

Figure 3:
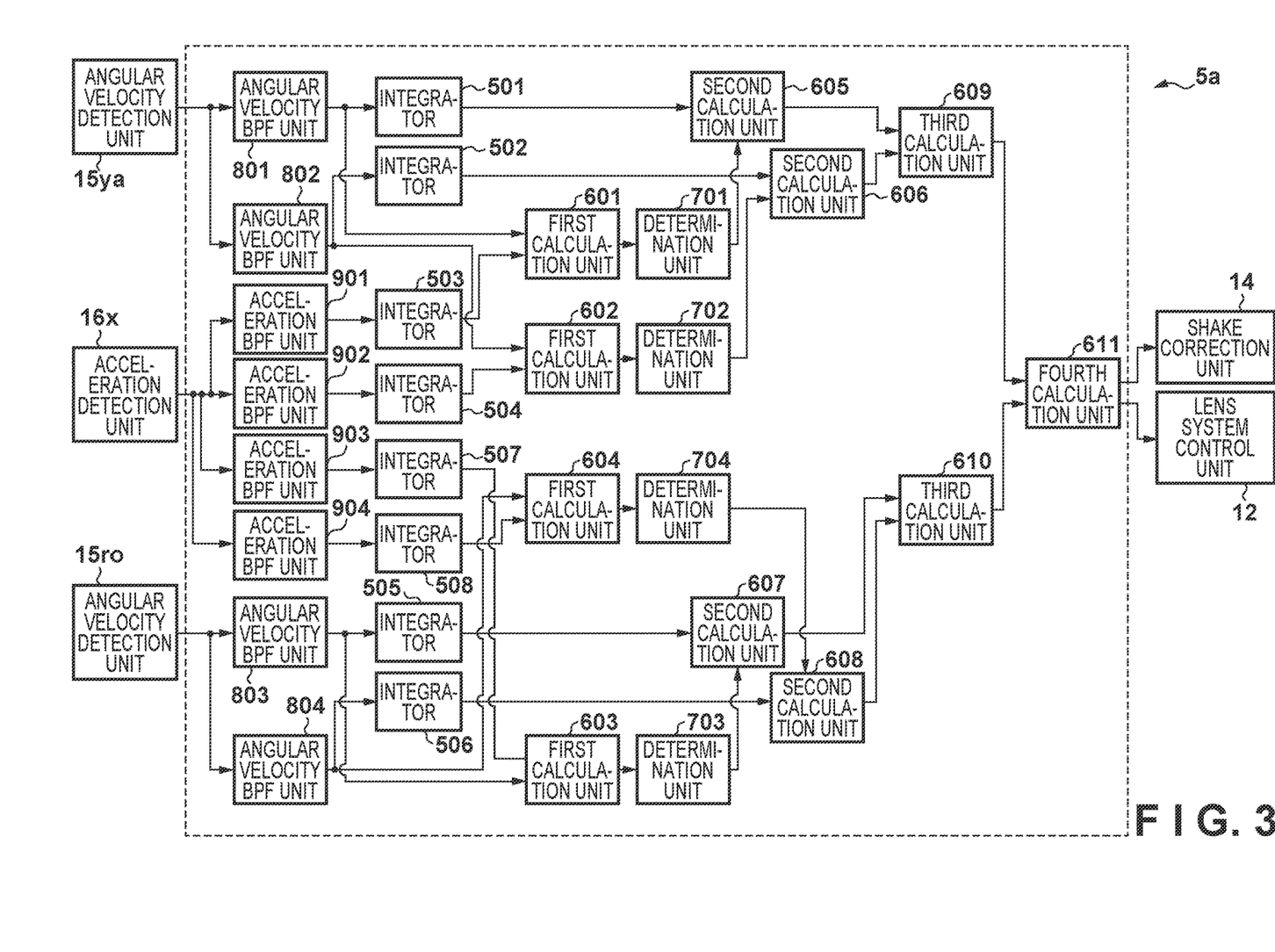
FIG. 3 is a block diagram showing a configuration of a shake correction amount calculation unit.

FIG. 3 is a block diagram showing a configuration of a shake correction amount calculation unit 5a in the camera system control unit 5, which calculates a shake correction amount. The acceleration detection unit 16 in FIG. 3 is the same as the acceleration detection unit 16 shown in FIG. 1B, and detects accelerations in the x axis direction, the y axis direction, and the z axis direction in FIG. 1A. The angular velocity detection unit 15 in FIG. 3 is the same as the angular velocity detection unit 15 shown in FIG. 1B, and detects the angular velocity about the x axis, the angular velocity about the y axis, and the angular velocity about the z axis. Note that FIG. 3 only shows a configuration for the shake in the x axis direction of the digital camera 100. Although configurations for the shake in the y axis direction and the z axis direction are omitted, they are the same as the configuration for the shake in the x axis.

In FIG. 3, an angular velocity detection unit 15ya detects an angular velocity about the y axis. Angular velocity BPF units 801 to 804 and acceleration BPF units 901 to 904 are bandpass filters (hereinafter referred to as BPFs), which are filters that each extract signals in a specific band only. The angular velocity BPF unit 801, the acceleration BPF unit 901, the angular velocity BPF unit 803, and the acceleration BPF unit 903 (hereinafter referred to as a BPF group A) are filters that extract signals in the same band. Also, the angular velocity BPF unit 802, the acceleration BPF unit 902, the angular velocity BPF unit 804, and the acceleration BPF unit 904 (hereinafter referred to as a BPF group B) are filters that extract signals in the same band.

Figure 4:
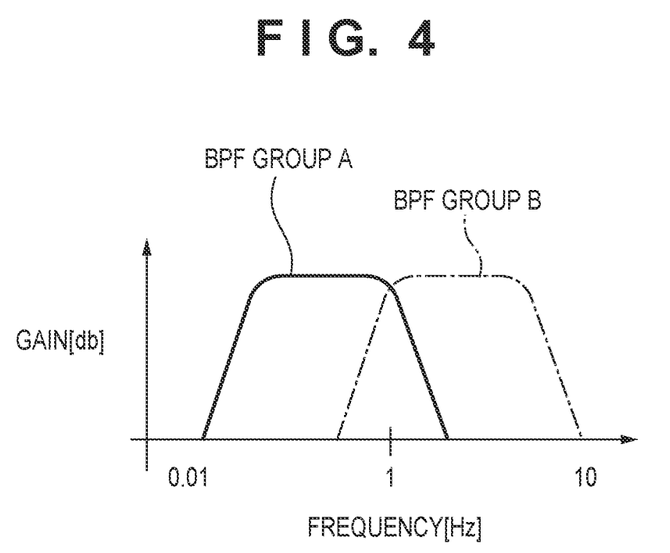
FIG. 4 is a diagram showing properties of BPFs.

FIG. 4 is a conceptual diagram showing the frequency bands of the BPF group A and the BPF group B. The BPF group A and the BPF group B each have a cutoff frequency of 1 Hz in common on one side thereof. This is in order to reduce the influence of the phase shift of output signals generated as a result of signals passing through the filters. The band of the BPFs through which signals can pass is the range of 0.01 Hz to 10 Hz in which shake caused by a user is generally included. The BPF group A is characterized in that signals of parallel shake in the range of 0.01 Hz to 1 Hz can pass therethrough. The BPF group B is characterized in that signals of parallel shake in the range of 1 Hz to 10 Hz can pass therethrough.

An angular velocity signal detected by the angular velocity detection unit 15ya is divided by the angular velocity BPF unit 801 and the angular velocity BPF unit 802 into angular velocity signals in a plurality of frequency bands. Output signals from the angular velocity BPF unit 801 and the angular velocity BPF unit 802 are respectively input to an integrator 501 and an integrator 502. The signals input to the integrator 501 and the integrator 502 are integrated, and an angle is output from each of them.

An acceleration detection unit 16x detects an acceleration in the x axis direction. The acceleration signal detected by the acceleration detection unit 16x is divided into acceleration signals in a plurality of frequency bands by the acceleration BPF unit 901 and the acceleration BPF unit 902. Output signals from the acceleration BPF unit 901 and the acceleration BPF unit 902 are respectively input to an integrator 503 and an integrator 504. The signals input to the integrator 503 and the integrator 504 are integrated, and a velocity is output from each of them.

The output signal from the angular velocity BPF unit 801 and the output signal from the integrator 503 are input to a first calculation unit 601, which calculates a ratio value. In other words, the output signal from the integrator 503 is divided by the output signal from the angular velocity BPF unit 801. This value indicates the rotational radius of a rotational movement in a specific band corresponding to the BPF of the digital camera 100 when it is assumed that the digital camera 100 is rotating. The output signal from the angular velocity BPF unit 802 and the output signal from the integrator 504 are input to a first calculation unit 602, which calculates a ratio value. This value indicates the rotational radius of a rotational movement in a specific band corresponding to the BPF of shake of the digital camera 100 when it is assumed that the digital camera 100 is rotating.

Ratios are calculated by the first calculation unit 601 and the first calculation unit 602 according to the following formulas.

$$r_{601} = v_{503}/\omega_{801} \tag{1}$$

$$r_{602} = v_{504}/\omega_{802} \tag{2}$$

Here, $v_{503}$ and $v_{504}$ are velocities, and are output from the integrator 503 and the integrator 504, respectively. $\omega_{801}$ and $\omega_{802}$ are angular velocities, and are output from the angular velocity BPF unit 801 and the angular velocity BPF unit 802. $r_{601}$ and $r_{602}$ are ratio values (the values of rotational radiuses) respectively calculated by the first calculation unit 601 and the first calculation unit 602.

The output signal from the first calculation unit 601 is input to a determination unit 701, which determines whether or not the ratio value calculated by the first calculation unit 601 is an appropriate value. The determination unit 701 outputs zero if the output result $r_{601}$ from the first calculation unit 601 is greater than 2000 mm, and outputs $r_{601}$ if $r_{601}$ is no greater than 2000 mm. Similarly, the output signal from the first calculation unit 602 is input to a determination unit 702, which determines whether or not the output signal from the first calculation unit 602 is an appropriate value. The determination unit 702 outputs zero if the output result $r_{602}$ from the first calculation unit 602 is greater than 2000 mm, and outputs $r_{602}$ if $r_{602}$ is no greater than 2000 mm. The output signal from the integrator 501 and the output signal from the determination unit 701 are input to a second calculation unit 605, which calculates shake of the digital camera 100 in the x axis direction generated due to an angle change regarding rotation about the y axis in the band of the angular velocity BPF unit 801. In other words, the output signal from the integrator 501 is multiplied by the output signal from the determination unit 701. The output signal from the integrator 502 and the output signal from the determination unit 702 are input to a second calculation unit 606, which calculates shake of the digital camera 100 in the x axis direction generated due to an angle change regarding rotation about the y axis in the band of the angular velocity BPF unit 802. In other words, the output signal from the integrator 502 is multiplied by the output signal from the determination unit 702.

The second calculation unit 605 and the second calculation unit 606 perform calculations according to the following formulas.

$$x_{ya605} = r_{701} \cdot \theta_{501} \tag{3}$$

$$x_{ya606} = r_{702} \cdot \theta_{502} \tag{4}$$

Here, $r_{701}$ and $r_{702}$ are ratio values, i.e. the values of rotational radiuses, and are output from the determination unit 701 and the determination unit 702. $\theta_{501}$ and $\theta_{502}$ are angles, and are output from the integrator 501 and the integrator 502, respectively. $x_{ya605}$ and $x_{ya606}$ indicate the amount of shake in the respective bands. These values are respectively calculated by the second calculation unit 605 and the second calculation unit 606.

The output signal $x_{ya605}$ from the second calculation unit 605 and the output signal $x_{ya606}$ from the second calculation unit 606 are input to a third calculation unit 609. The third calculation unit 609 adds the input signals to each other. The signal obtained by the third calculation unit 609 indicates shake of the digital camera 100 in the x axis direction.

An angular velocity detection unit 15ro detects the angular velocity of rotation about the z axis. The angular velocity signal detected by the angular velocity detection unit 15ro is divided into signals in a plurality of frequency bands by the angular velocity BPF unit 803 and the angular velocity BPF unit 804. The output signals from the angular velocity BPF unit 803 and the angular velocity BPF unit 804 are respectively input to an integrator 505 and an integrator 506. The signals input to the integrator 505 and the integrator 506 are integrated, and an angle is output from each of them.

An acceleration detection unit 16x detects an acceleration in the x axis direction. The acceleration signal detected by the acceleration detection unit 16x is divided into signals in a plurality of frequency bands by the acceleration BPF unit 903 and the acceleration BPF unit 904. The output signals from the acceleration BPF unit 903 and the acceleration BPF unit 904 are respectively input to an integrator 507 and an integrator 508. The signals input to the integrator 507 and the integrator 508 are integrated, and a velocity is output from each of them.

The output signal from the angular velocity BPF unit 803 and the output signal from the integrator 507 are input to a first calculation unit 603, which calculates a ratio value. This value indicates the rotational radius of a rotational movement in a specific band corresponding to the BPF of the digital camera 100 when it is assumed that the digital camera 100 is rotating. The output signal from the angular velocity BPF unit 804 and the output signal from the integrator 508 are input to a first calculation unit 604, which calculates a ratio value. This value indicates the rotational radius of a rotational movement in a specific band corresponding to the BPF of the digital camera 100 when it is assumed that the digital camera 100 is rotating.

The first calculation unit 603 and the first calculation unit 604 perform calculations according to the following formulas.

$$r_{603} = v_{507}/\omega_{803} \quad (5)$$

$$r_{604} = v_{508}/\omega_{804} \quad (6)$$

Here, $v_{507}$ and $v_{508}$ are velocities, and are output from the integrator 507 and the integrator 508, respectively. $\omega_{803}$ and $\omega_{804}$ are angular velocities, and are output from the angular velocity BPF unit 803 and the angular velocity BPF unit 804. $r_{603}$ and $r_{604}$ are ratio values (the values of rotational radiuses) respectively calculated by the first calculation unit 603 and the first calculation unit 604.

The output signal from the first calculation unit 603 is input to a determination unit 703, which determines whether or not the ratio calculated by the first calculation unit 603 is an appropriate value. The determination unit 703 outputs zero if the output result $r_{603}$ from the first calculation unit 603 is greater than 2000 mm, and outputs $r_{603}$ if $r_{603}$ is no greater than 2000 mm. Similarly, the output signal from the first calculation unit 604 is input to a determination unit 704, which determines whether or not the output signal from the first calculation unit 604 is an appropriate value. The determination unit 704 outputs zero if the output result $r_{604}$ from the first calculation unit 604 is greater than 2000 mm, and outputs $r_{604}$ if $r_{604}$ is no greater than 2000 mm.

The output signal from the integrator 505 and the output signal from the determination unit 703 are input to a second calculation unit 607, which calculates shake of the digital camera 100 in the x axis direction generated due to an angle change regarding rotation about the z axis in the band of the angular velocity BPF unit 803. The output signal from the integrator 506 and the output signal from the determination unit 704 are input to a second calculation unit 608, which calculates shake of the digital camera 100 in the x axis direction generated due to an angle change regarding rotation about the z axis in the band of the angular velocity BPF unit 804.

The second calculation unit 607 and the second calculation unit 608 perform calculations according to the following formulas.

$$x_{ro607} = r_{703} \cdot \theta_{505} \quad (7)$$

$$x_{ro608} = r_{704} \cdot \theta_{506} \quad (8)$$

Here, $r_{703}$ and $r_{704}$ are ratio values, i.e. the values of rotational radiuses, and are output from the determination unit 703 and the determination unit 704. $\theta_{505}$ and $\theta_{506}$ are angles, and are output from the integrator 505 and the integrator 506, respectively. $X_{ro607}$ and $X_{ro608}$ indicate the amounts of shake in the respective bands. These values are respectively calculated by the second calculation unit 607 and the second calculation unit 608.

The output signal $X_{ro607}$ from the second calculation unit 607 and the output signal $X_{ro608}$ from the second calculation unit 608 are input to a third calculation unit 610. The third calculation unit 610 adds the input signals to each other. The signal obtained by the third calculation unit 610 indicates shake of the digital camera 100 in the x axis direction.

The shake of the digital camera 100 in the x axis direction generated due to a rotational movement about the y axis, obtained by the third calculation unit 609, and the shake of digital camera 100 in the x axis direction generated due to a rotational movement about the z axis, obtained by the third calculation unit 610, are input to a fourth calculation unit 611. The fourth calculation unit 611 performs processing to add the input signals to each other, thereby calculating the shake of the digital camera 100 in the x axis direction. The amount of shake of the digital camera 100 in the x axis direction is to be corrected in the x axis direction. The result of the calculation performed by the fourth calculation unit 611 is output to the shake correction unit 14 and the lens system control unit 12. The shake correction unit 14 and the lens system control unit 12 correct the shake of the digital camera 100 based on the result of the calculation performed by the fourth calculation unit 611.

Although the present embodiment describes calculation of a shake correction amount in the x axis direction of the digital camera 100, the shake correction amount in the y axis direction and the shake correction amount in the z axis direction can be calculated in the same manner. The shake correction amount in the y axis direction is calculated by using a value obtained by the angular velocity detection unit that detects the angular velocity about the z axis, a value obtained by the angular velocity detection unit that detects the angular velocity about the x axis, and a value obtained by the acceleration detection unit that detects the acceleration in the y axis direction. The shake correction amount in the z axis direction is calculated by using a value obtained by the angular velocity detection unit that detects the angular velocity about the x axis, a value obtained by the angular velocity detection unit that detects the angular velocity about the y axis, and a value obtained by the acceleration detection unit that detects the acceleration in the z axis direction.

With reference to the block diagram shown in FIG. 3, when the shake correction amount regarding the y axis is to be calculated, the angular velocity detection unit 15ya is changed to the angular velocity detection unit 15ro that detects the angular velocity about the z axis, and the angular velocity detection unit 15ro is changed to an angular velocity detection unit 15pi that detects the angular velocity about the x axis. The acceleration detection unit 16x is changed to an acceleration detection unit 16y that detects an acceleration in the y axis direction. Similarly, with reference to the block diagram shown in FIG. 3, when the shake correction amount regarding the z axis is to be calculated, the angular velocity detection unit 15ya is changed to the angular velocity detection unit 15pi that detects the angular velocity about the x axis, and the angular velocity detection unit 15ro is changed to the angular velocity detection unit 15ya that detects the angular velocity about the y axis. The acceleration detection unit 16x is changed to an acceleration detection unit 16z that detects an acceleration in the z axis direction.

Although it is assumed that the digital camera 100 is held in a normal position, if the digital camera 100 is held in a vertical position, the relationship between the user and the axes changes, and thus the axes to be used are interchanged. The shake correction amount in the x axis direction is calculated using a value obtained by the angular velocity detection unit that detects the angular velocity about the z axis and a value obtained by the angular velocity detection unit that detects the angular velocity about the y axis. The shake correction amount in the y axis direction is calculated using a value obtained by the angular velocity detection unit that detects the angular velocity about the z axis and a value obtained by the angular velocity detection unit that detects the angular velocity about the x axis. The shake correction amount in the z axis direction is calculated by using a value obtained by the angular velocity detection unit that detects the angular velocity about the x axis and a value obtained by the angular velocity detection unit that detects the angular velocity about the y axis.

Also, when the digital camera 100 is held in an oblique position or the like, detection is performed by detecting the gravity direction of the digital camera 100 to define absolute coordinate system axes, and converting the output values from the sensors into values on the absolute coordinate system axes.

Also, although FIG. 3 shows an example in which angular velocity meters are used as the angular velocity detection units and accelerometers are used as the acceleration detection units, another detection method may be employed. For example, a method through which an acceleration is detected based on vector information that can be obtained from image signals from the digital camera 100, or a method through which an acceleration is detected using a GPS may be employed as an acceleration detection method, for example. A method through which an angular velocity is detected from image signals from the image capturing apparatus may be employed as an angular velocity detection method, for example. It is also possible to employ a method through which an image of the digital camera 100 is captured using an external camera and an angular velocity and an acceleration are detected based on vector information that can be obtained from image signals from the external camera.

Also, although angular velocity detection units are described as means for detecting the rotation component of shake, it is possible to employ means for detecting a rotation component other than an angular velocity. A rotation component may be detected not only as an angular velocity, but also as an angle or an angular acceleration. Although acceleration detection units are shown as means for detecting a translation component of shake, it is possible to employ means for detecting a translation component other than an acceleration. A translation component may be detected not only as an acceleration, but also as a position or a velocity. A position, an acceleration, an angle, and an angular acceleration may be detected based on vector information that can be obtained from image signals from the digital camera 100. Also, an image of the digital camera 100 may be captured using an external camera, and the position, acceleration, angle, and angular acceleration of the digital camera 100 may be detected based on vector information that can be obtained from image signals from the external camera.

In the calculations performed by the second calculation units 605 to 608, the dimensions of the input signals need be the same. That is to say, the inputs need be a combination of an angle and a position, an angular acceleration and an acceleration, and an angular velocity and a velocity. Therefore, if a velocity is used instead of an acceleration detected by the acceleration detection unit 16x, the integrator 503, the integrator 504, the integrator 507, and the integrator 508 are unnecessary.

Regarding the determination units 701 to 704, although the determination criteria regarding a rotational radius is 2000 mm above, the determination criteria may be changed according to shooting conditions, the height of the user, and so on. For example, the determination criteria regarding a rotational radius may be 500 mm, and a rotational radius no greater than 500 mm does not necessarily have to be used. Also, the frequency band of the shake to be extracted may be changed. Also, although filters are used to extract signals within specific frequency bands above, such signals may be extracted using the Fourier transform or the like.

Figure 5:
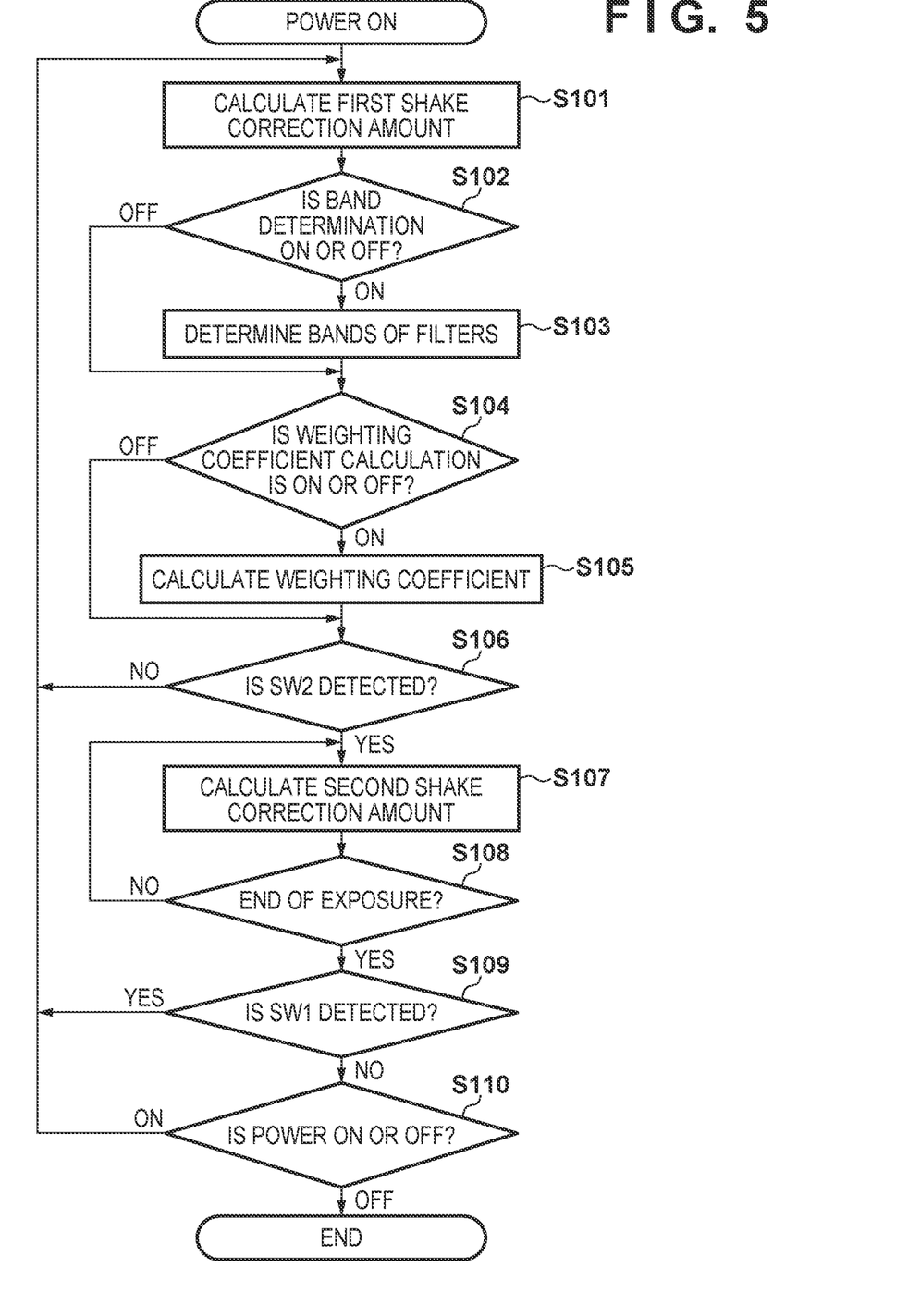
FIG. 5 is a flowchart showing operations for shake correction processing performed by the digital camera 100.

FIG. 5 is a flowchart showing operations for shake correction processing performed by the digital camera 100, and shows an example in which bands of filters are determined and a weighting coefficient calculation is performed. The flowchart shown in FIG. 5 is started upon the digital camera 100 being powered ON. Upon processing being started, the shake correction unit 14 and the lens drive unit 13 start driving the imaging device 6 and the image stabilization lens 9.

In step S101, a first shake correction amount calculation is performed. The first shake correction amount calculation is performed to calculate the shake correction amount through blocks up to the fourth calculation unit 611 shown in FIG. 3, and halve the obtained value. Using the value obtained through the first shake correction amount calculation as a target amount of movement, signals are sent to the shake correction unit 14 and the lens drive unit 13, and the imaging device 6 and the image stabilization lens 9 are driven (pre-exposure driving). The shake correction amount is halved in order to secure a stabilization stroke at the time of exposure.

In step S102, whether band determination is ON or OFF is determined. If band determination is OFF in step S102, processing does not proceed to step S103, and proceeds to the next step S104. If band determination is ON in step S102, the processing in step S103 is performed to determine the bands of filters.

The camera system control unit 5 determines the bands of filters in step S103. Through the calculation for determining the bands of filters in step S103, the bands of the BPF group A and the BPF group B and the number of filters are determined. Although bandpass filters (hereinafter referred to as "BPFs") are employed as the angular velocity BPF units 801 to 804 and the acceleration BPF units 901 to 904 in FIG. 3, high-pass filters (hereinafter referred to as "HPFs") or low-pass filters (hereinafter referred to as "LPFs") may be employed instead. HPFs and LPFs are both filters that extract signals with a frequency no lower than or lower than a specific band. The BPF group A consists of the same type of filters (HPFs) that extract signals in a band no lower than a predetermined frequency. The BPF group B consists of the same type of filters (LPFs) that extract signals in a band lower than a predetermined frequency. The BPF group A and the BPF group B are configured to have the same cutoff frequency. This is in order to reduce the influence of the phase shift of output signals generated as a result of signals passing through the filters. The combination of the BPF group A and the BPF group B may be the combination of BPFs and HPFs, LPFs and BPFs, or LPFs and HPFs. Either order may be employed.

Movements in a band lower than 1 Hz typically include rotational movements about a foot of a human body. Movements in a band higher than 1 Hz typically include rotational movements about a part higher than a foot of a human body. Therefore, the passband of the BPFs is 0.01 Hz to 1 Hz, the passband of the HPFs is higher than 1 Hz, and the passband of the LPFs is lower than 1 Hz. Two types of filters are selected from among BPFs, HPFs, and LPFs. If movements with three or more rotational radiuses need to be dealt with, three or more type of filters are used. At this time, filters with bands that are respectively suitable for the rotational movements are used.

Figure 6:
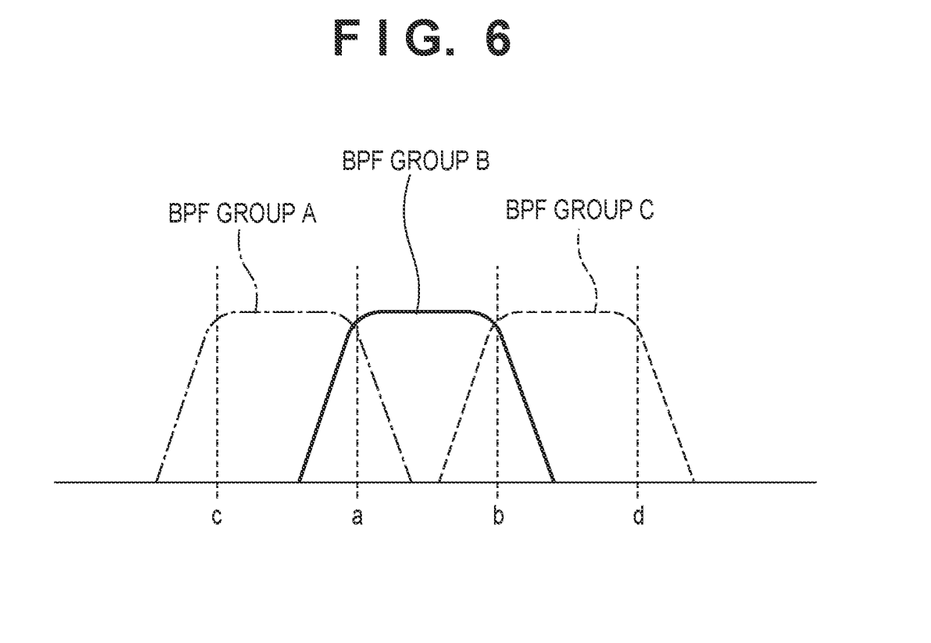
FIG. 6 is a diagram showing properties of BPFs.

FIG. 6 is a diagram showing a change in the bands in a case where three types of filters are used. a, b, c, and d in FIG. 6 indicate cutoff frequencies. The BPF groups are respectively referred to as a BPF group A, a BPF group B, and a BPF group C. The BPF group A and the BPF group B each have the same cutoff frequency a on one side thereof. The BPF group B and the BPF group C each also have the same cutoff frequency b on one side thereof. The bands are changed by changing the cutoff frequencies a, b, c, and d. If HPFs or LPFs are used instead of the BPFs, c and d do not exist.

Through the filter band determination performed by the camera system control unit 5 in step S103, the bands and the number of filters are changed according to the shutter speed and the height of the user as well.

First, changing of the bands and the number of filters according to the shutter speed (an exposure condition) will be described. When the bands and the number of filters are to be changed, the amplitude of shake that can be envisaged at a specific shutter speed is taken into account. The angular velocity or the acceleration acquired before the switch SW2 is turned ON is divided into a plurality of frequency bands. Regarding each of the shake components divided into a plurality of frequency bands, the amplitude of the shake component that occurs during the currently set shutter period (exposure time) is obtained. If the obtained amplitude is smaller than a predetermined value, an output from such a band is not used. When the obtained amplitude is no smaller than the predetermined value, the second calculation units 605 and 608 use an output from such a band. The amplitude of shake in a lower band is likely to be larger, and when the shutter speed is low, shake in a low frequency band has a large influence. Therefore, when the shutter speed is low, a filter with a low frequency band is often used. When the shutter speed is high, the influence of shake in a low frequency band is small, and shake in a high frequency band has a large influence. Therefore, when the shutter speed is high, a filter with a high frequency band is often used.

The following describes changing of the bands and the number of filters according to the height of the user. The bands and the number of filters are selected based on information regarding the height of the user input by the user and detected by the operation detection unit 8. A table of filters corresponding to heights are created in advance. Generally, the larger the height is, the lower the band of shake is, and the smaller the height is, the higher the band of shake is. Therefore, a table is created such that a filter with a high frequency band will be selected when the height is small, and a filter with a low frequency band will be selected when the height is large.

Although a method through which information regarding the height is input by the user is shown above, it is possible to employ a method through which the height is measured using a sensor such as a range finder. Also, although a method through which a filter is selected based on a table is shown above, the band of a filter may be determined by calculating the period from information regarding the height.

With reference to FIG. 5 again, whether weighting coefficient calculation is ON or OFF is determined in step S104. If weighting coefficient calculation is OFF in step S104, processing does not proceed to step S105, and proceeds to step S106. If weighting coefficient calculation is ON, processing proceeds to step S105. The weighting coefficient calculation in step S105 is performed by the camera system control unit 5. The camera system control unit 5 determines the weighting coefficients to be used when the third calculation units 609 and 610 perform an addition calculation.

The following describes the calculation of weighting coefficients according to the shutter speed and the shooting mode performed through this coefficient calculation. The angular velocity or the acceleration acquired before the switch SW2 is turned ON is divided into a plurality of frequency bands. Regarding each of the shake components divided into a plurality of frequency bands, the amplitude of the shake component that occurs during the currently set shutter period (exposure time) is obtained. A weighting coefficient is determined for each frequency according to such amplitudes. A large weight is applied to a frequency band in which the amplitude of shake that occurs during the shooting period is large, and a smaller weight is applied to a frequency band in which the amplitude is small. For example, the influence of shake in a low frequency band is generally not dominant when the shutter speed is high. Therefore, when the shutter speed is high, the weight for a shake component in a low frequency band is set to be small. In contrast, the influence of shake in a low frequency band is generally dominant when the shutter speed is low. Therefore, when the shutter speed is low, the weight for a shake component in a low frequency band is set to be large.

Weighting coefficients are also changed when a night view mode is selected as the shooting mode. In the night view mode, the shutter speed is generally low, and therefore, the weighting coefficient for a shake component in a low frequency band is set to be large.

In step S106, it is determined whether or not the ON state of the switch SW2 has been detected. If the ON state of the switch SW2 is not detected, processing returns to step S101. If the ON state of the switch SW2 has been detected in step S106, a second shake correction amount calculation is performed in step S107. Upon the ON state of the switch SW2 being detected, switching to in-exposure driving is performed, in which the imaging device 6 and the image stabilization lens 9 are driven according to the result of the second shake correction amount calculation. In pre-exposure driving, a value obtained by halving the calculated shake correction amount is used, whereas in in-exposure driving, the calculated shake correction amount is used without change. The result of the second shake correction amount calculation is the shake correction amount obtained through the blocks up to the fourth calculation unit 611 in FIG. 3.

Step S107 is repeated until the end of exposure is detected in step S108. Upon the end of exposure being detected in step S108, whether the switch SW1 is ON or OFF is determined in step S109. If the ON state of the switch SW1 is detected in step S109, processing returns to step S101 because there is the possibility that shooting will be continued. If the ON state of the switch SW1 is not detected in step S109, processing proceeds to step S110.

In step S110, whether the power is ON or OFF is determined. If a power ON state is detected, processing returns to step S101. If a power OFF state is detected in step S110, processing is terminated.

Note that the filter band determination in step S103 and the weighting coefficient calculation in step S105 may be performed in real time when the second stabilization calculation is performed in step S107.

As described above, with the above embodiment, it is possible to correct parallel shake caused by the presence of a plurality of rotation centers, which cannot be calculated using conventional methods. Thus, it is possible to provide an image capturing apparatus that can perform accurate stabilization.

Although the digital camera 100 is described above as a so-called mirrorless interchangeable-lens digital camera, the present invention is applicable to various optical devices such as compact digital cameras, digital single-lens reflex cameras, digital video cameras, action cameras, and mobile phones.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-046376, filed Mar. 13, 2019, which is hereby incorporated by reference herein in its entirety.

What is claimed is:

1. An image stabilization control apparatus comprising:
at least one processor or circuit configured to function as:
an extraction unit configured to extract signals in a plurality of frequency bands from a signal output from a first shake detection sensor that detects a translation component of shake in a direction of a first axis, and extract signals in the plurality of frequency bands from a signal output from a second shake detection sensor that detects a rotation component of shake about a second axis that is orthogonal to the first axis;
a first calculation unit configured to calculate a rotational radius of shake for each of the plurality of frequency bands, using the signal output from the first shake detection sensor, extracted by the extraction unit, and the signal output from the second shake detection sensor, extracted by the extraction unit; and
a second calculation unit configured to calculate a parallel shake amount in the direction of the first axis for each of the plurality of frequency bands, using the signal output from the second shake detection sensor, extracted by the extraction unit, and the rotational radius of shake, calculated for the same frequency band as that of the output signal from the second shake detection sensor.

2. The image stabilization control apparatus according to claim 1,
wherein the first calculation unit calculates the rotational radius of shake by dividing a signal obtained by integrating signals output from the first shake detection sensor, by a signal output from the second shake detection sensor.

3. The image stabilization control apparatus according to claim 1,
wherein the second calculation unit calculates the parallel shake amount in the direction of the first axis for each of the plurality of frequency bands by multiplying the rotational radius of shake by an angle of shake about the second axis detected by the second shake detection sensor.

4. The image stabilization control apparatus according to claim 1, wherein the second shake detection sensor is an angular velocity meter.

5. The image stabilization control apparatus according to claim 1, wherein the first shake detection sensor is an accelerometer.

6. The image stabilization control apparatus according to claim 1, wherein the extraction unit uses a plurality of bandpass filters to extract signals in the plurality of frequency bands from a signal output from the first shake detection sensor and a signal output from the second shake detection sensor.

7. The image stabilization control apparatus according to claim 1, wherein the at least one processor or circuit is configured to further function as
a determination unit configured to determine whether or not the rotational radius of shake calculated by the first calculation unit is an appropriate value.

8. The image stabilization control apparatus according to claim 1, wherein the at least one processor or circuit is configured to further function as
a fourth calculation unit configured to add a parallel shake amount in the direction of the first axis, calculated from a rotation component of shake about the second axis, and a parallel shake amount in the direction of the first axis, calculated from a rotation component of shake about a third axis that is orthogonal to the first axis and the second axis, to each other.

9. An image capturing apparatus comprising:
an imaging device configured to generate an image signal;
a first shake detection sensor configured to detect a translation component of shake in a direction of a first axis;

a second shake detection sensor configured to detect a rotation component of shake about a second axis that is orthogonal to the first axis; and at least one processor or circuit configured to function as:

an extraction unit configured to extract signals in a plurality of frequency bands from a signal output from the first shake detection sensor, and extract signals in the plurality of frequency bands from a signal output from the second shake detection sensor;

a first calculation unit configured to calculate a rotational radius of shake for each of the plurality of frequency bands, using the signal output from the first shake detection sensor, extracted by the extraction unit, and the signal output from the second shake detection sensor, extracted by the extraction unit; and a second calculation unit configured to calculate a parallel shake amount in the direction of the first axis for each of the plurality of frequency bands, using the signal output from the second shake detection sensor, extracted by the extraction unit, and the rotational radius of shake, calculated for the same frequency band as that of the output signal from the second shake detection sensor.

10. The image capturing apparatus according to claim 9, wherein the first shake detection sensor detects a translation component of shake in the direction of the first axis from the image signal.

11. The image capturing apparatus according to claim 9, wherein the at least one processor or circuit is configured to further function as a changing unit configured to change a frequency band of a signal that is extracted by the extraction unit, according to a shooting condition.

12. The image capturing apparatus according to claim 11, wherein the at least one processor or circuit is configured to further function as an accepting unit configured to accept an input from a user, wherein the changing unit changes the frequency band of a signal that is extracted by the extraction unit, based on the input from the user accepted by the accepting unit.

13. The image capturing apparatus according to claim 11, further comprising an imaging device that generates an image signal, wherein the changing unit changes the frequency band of a signal that is extracted by the extraction unit, according to an exposure condition of the imaging device.

14. The image capturing apparatus according to claim 9, wherein the at least one processor or circuit is configured to further function as a third calculation unit that adds the respective parallel shake amounts in the direction of the first axis in the plurality of frequency bands.

15. The image capturing apparatus according to claim 14, wherein the third calculation unit adds the respective parallel shake amounts in the direction of the first axis in the plurality of frequency bands, after weighting the parallel shake amounts according to a shooting condition.

16. The image capturing apparatus according to claim 15, wherein the shooting condition is a shutter speed.

17. The image capturing apparatus according to claim 15, wherein the shooting condition is a condition regarding whether or not a night view mode is selected.

18. A method of controlling an image stabilization apparatus, comprising:

performing a first shake detection to detect a translation component of shake in a direction of a first axis;

performing a second shake detection to detect a rotation component of shake about a second axis that is orthogonal to the first axis;

extracting signals in a plurality of frequency bands from a signal output from the first shake detection, and extracting signals in the plurality of frequency bands from a signal output from the second shake detection;

performing a first calculation to calculate a rotational radius of shake for each of the plurality of frequency bands, using the signal output from the first shake detection, extracted in the extraction, and the signal output from the second shake detection, extracted in the extraction; and performing a second calculation to calculate a parallel shake amount in the direction of the first axis for each of the plurality of frequency bands, using the signal output from the second shake detection, extracted in the extraction, and the rotational radius of shake, calculated for the same frequency band as that of the output signal from the second shake detection.

19. A non-transitory computer-readable storage medium having stored thereon a program for causing a computer to execute steps of a method of controlling an image stabilization apparatus, the method comprising:

performing a first shake detection to detect a translation component of shake in a direction of a first axis;

performing a second shake detection to detect a rotation component of shake about a second axis that is orthogonal to the first axis;

extracting signals in a plurality of frequency bands from a signal output from the first shake detection, and extracting signals in the plurality of frequency bands from a signal output from the second shake detection;

performing a first calculation to calculate a rotational radius of shake for each of the plurality of frequency bands, using the signal output from the first shake detection, extracted in the extraction, and the signal output from the second shake detection, extracted in the extraction; and performing a second calculation to calculate a parallel shake amount in the direction of the first axis for each of the plurality of frequency bands, using the signal output from the second shake detection, extracted in the extraction, and the rotational radius of shake, calculated for the same frequency band as that of the output signal from the second shake detection.

\* \* \* \* \*